United States Patent
Povlovitsch Seixas (10) Patent No.: US 11,661,877 B2
(45) Date of Patent: May 30, 2023

(54) PREDICTIVE MACHINE LEARNING FOR PREDICTING A RESONANCE FREQUENCY OF A CATALYST FOR THE SELECTIVE CATALYTIC REDUCTION OF NITROGEN OXIDES

(71) Applicant: VITESCO TECHNOLOGIES GmbH, Hanover (DE)

(72) Inventor: Michel Povlovitsch Seixas, Toulouse (FR)

(73) Assignee: VITESCO TECHNOLOGIES GMBH, Hannover (DE)

( * ) Notice: Subject to any disclaimer, the term of this patent is extended or adjusted under 35 U.S.C. 154(b) by 161 days.

(21) Appl. No.: 17/059,817

(22) PCT Filed: May 31, 2019

(86) PCT No.: PCT/FR2019/051286
§ 371 (c)(1),
(2) Date: Nov. 30, 2020

(87) PCT Pub. No.: WO2019/229398
PCT Pub. Date: Dec. 5, 2019

(65) Prior Publication Data
US 2021/0215077 A1   Jul. 15, 2021

(30) Foreign Application Priority Data
Jun. 1, 2018  (FR) ..................................... 1854787

(51) Int. Cl.
*F01N 3/20*   (2006.01)
*G06N 20/00*  (2019.01)
*G06N 5/04*   (2023.01)

(52) U.S. Cl.
CPC ............... *F01N 3/208* (2013.01); *G06N 5/04* (2013.01); *G06N 20/00* (2019.01); *F01N 3/2066* (2013.01);
(Continued)

(58) Field of Classification Search
CPC ......... F01N 2560/12; F01N 2900/0402; F01N 2900/0408; F01N 2900/16;
(Continued)

(56) References Cited

U.S. PATENT DOCUMENTS

2010/0307140 A1   12/2010  Viola et al.
2016/0279574 A1*   9/2016  Devarakonda ..... B01D 53/9436
(Continued)

FOREIGN PATENT DOCUMENTS

CN         105829672 A       8/2016
DE      10 2010 034983       2/2012
(Continued)

OTHER PUBLICATIONS

International Search Report and Written Opinion of the ISA for PCT/FI2019/051286, dated Sep. 19, 2019, 11 pages.
(Continued)

*Primary Examiner* — Carl C Staubach
*Assistant Examiner* — Diem T Tran
(74) *Attorney, Agent, or Firm* — Nixon & Vanderhye (57) ABSTRACT

The subject matter of the present invention relates to trained machine-learning models (300), methods (200, 400) and apparatuses (500) allowing a future resonant frequency of a catalyst for selective reduction of nitrogen oxides (SCR) to be predicted, the resonant frequency being representative of a concentration of a reducing agent within the SCR. The SCR forms part of a system for after-treatment of a flow of exhaust gases of an internal combustion engine with which a motor vehicle is provided. The general principle of the
(Continued)

invention is based on the observation of correlations between the resonant frequency of an SCR and the concentration of ammonia present within the SCR. This observation led the inventor to envision using machine learning to create a trained machine-learning model in order to predict the resonant frequency of an SCR. In the invention, the trained machine-learning model is a so-called predictive model in which significant correlations are discovered in a set of past observations and in which it is sought to generalize these correlations to cases that have not yet been observed.

20 Claims, 6 Drawing Sheets (52) U.S. Cl.
CPC .. *F01N 2900/0402* (2013.01); *F01N 2900/16* (2013.01)
(58) Field of Classification Search
CPC ........... F01N 2900/1622; F01N 3/2066; F01N 3/208; G06N 20/00; G06N 5/00; G06N 5/04; Y02A 50/20; Y02T 10/12
See application file for complete search history.

(56) References Cited

U.S. PATENT DOCUMENTS

| | | | |
|---|---|---|---|
| 2016/0333760 A1* | 11/2016 | Blomgren | F01N 3/208 |
| 2017/0182447 A1* | 6/2017 | Sappok | F01N 11/00 |
| 2017/0211453 A1* | 7/2017 | Sappok | G01N 22/04 |

FOREIGN PATENT DOCUMENTS

| | | |
|---|---|---|
| DE | 10 2016 219646 | 4/2018 |
| JP | 2001-188602 A | 7/2001 |
| WO | 2009/025560 A1 | 2/2009 |
| WO | 2015/090342 | 6/2015 |

OTHER PUBLICATIONS

Office Action issued in Chinese Patent Application No. 201980050787.3 dated Dec. 21, 2021.

* cited by examiner

PREDICTIVE MACHINE LEARNING FOR PREDICTING A RESONANCE FREQUENCY OF A CATALYST FOR THE SELECTIVE CATALYTIC REDUCTION OF NITROGEN OXIDES

CROSS-REFERENCE TO RELATED APPLICATION

This application is the U.S. national phase of International Application No. PCT/FR2019/051286 filed 31 May 2019, which designated the U.S. and claims priority to FR Patent Application No. 1854787 filed 1 Jun. 2018, the entire contents of each of which are hereby incorporated by reference.

BACKGROUND OF THE INVENTION

Field of the Invention

The present invention relates to the field of predicting the future resonant frequency of a catalyst for selective reduction of nitrogen oxides (SCR), which is representative of a concentration of a reducing agent within the SCR. More precisely, it relates to trained machine-learning models, methods, apparatuses and a set of computer programs allowing such a resonant frequency to be predicted.

In the towns and cities of industrialized countries, air quality is being improved by decreasing concentrations of nitrogen oxides (NOx) and therefore the emission thereof. Since the contribution of transportation to the emission of NOx is very sizeable, regulators have set increasingly strict standards for motor vehicles.

Description of the Related Art

Thus, it is known to use catalytic reduction techniques such as selective catalytic reduction (SCR) to decrease the amount of NOx released to the atmosphere.

SCR is a technique for after-treatment of exhaust gases that consists in selectively reducing the NOx into nitrogen via continuous injection of a specific reducing agent in the presence of a catalyst. In practice, the reducing agent used consists of an aqueous urea solution that, when it undergoes thermolysis followed by hydrolysis, decomposes into ammonia and carbon dioxide. Subsequently, on reacting with the ammonia, the NOx molecules present in the SCR are converted into nitrogen and water vapor, before being released to the atmosphere.

However, continuously injecting too large an amount of reducing agent may cause an over-abundance of ammonia to form in the SCR, with respect to the amount of molecules of NOx to be processed. Thus, such an over-abundance of ammonia may end up in the gaseous emissions expelled from the SCR during the release to atmosphere (referred to as "ammonia slip"). Now, it is known that exposure to ammonia may affect the human respiratory system while irritating and causing inflammation of the respiratory tract.

It is therefore necessary to be able to determine the concentration of ammonia present within the SCR in order to suitably control the continuous injection of the reducing agent.

SUMMARY OF THE INVENTION

The present invention therefore aims to address the aforementioned drawbacks. To this end, according to a first aspect of the invention, the invention provides a trained machine-learning model for predicting the future resonant frequency of a catalyst for selective reduction of nitrogen oxides (SCR). According to the invention, the resonant frequency is representative of a concentration of a reducing agent within the SCR.

According to a second aspect of the invention, a method for predicting the future resonant frequency of an SCR using the trained machine-learning model of the first aspect of the invention is provided.

According to a third aspect of the invention, a method for predicting the future concentration of a reducing agent in an SCR using steps of the method of the second aspect of the invention is provided.

According to a fourth aspect of the invention, an apparatus for predicting the future resonant frequency of an SCR using steps of the method of the second aspect of the invention is provided.

According to a fifth aspect of the invention, an apparatus for predicting the future concentration of a reducing agent in an SCR using steps of the method of the third aspect of the invention is provided.

Lastly, according to a sixth aspect of the invention, an apparatus for controlling the addition of a reducing agent in an exhaust system using the apparatuses of the fourth and fifth aspects of the invention is provided.

Thus, the invention relates to a trained machine-learning model for predicting a future resonant frequency of a catalyst for selective reduction of nitrogen oxides (SCR) the resonant frequency being representative of a concentration of a reducing agent within the SCR, the SCR forming part of a system for after-treatment of a flow of exhaust gases of an internal combustion engine with which a motor vehicle is provided, the after-treatment system comprising the reducing agent, which is intended to be added to the flow of exhaust gases upstream of the SCR. The trained machine-learning model is obtained via the following steps:

acquiring, at each of the acquisition times of a plurality of successive acquisition times, for each among a plurality of training motor vehicles comprising the internal combustion engine in operation and the SCR, a resonant frequency of the SCR, characteristics of the internal combustion engine and characteristics of the SCR, computing, at each acquisition time, for each among the plurality of training motor vehicles, first mathematical quantities from a plurality of characteristics of the internal combustion engine and a plurality of characteristics of the SCR, these characteristics being acquired at acquisition times comprised in a preset time period preceding the current acquisition time, creating, for each among the plurality of training motor vehicles, a characteristic vector from the characteristics of the internal combustion engine, from the characteristics of the SCR and from the first mathematical quantities, associating, at each acquisition time, for each among the plurality of training motor vehicles, the characteristic vector with the resonant frequency of the SCR, so as to obtain first machine-learning-model variables, and training a machine-learning model to predict, for a future time horizon closer than or equal to the preset time period, a future resonant frequency of the SCR forming part of the system for after-treatment of the flow of exhaust gases of the internal combustion engine of a motor vehicle, using a machine-learning algorithm and the first machine-learning-model variables.

According to a first embodiment, the trained machine-learning model is furthermore obtained via the following steps:
- acquiring, at each acquisition time, for each among the plurality of training motor vehicles, characteristics of the fluids flowing through the after-treatment system,
- computing, at each acquisition time, for each among the plurality of training motor vehicles, second mathematical quantities from a plurality of characteristics of the fluids flowing through the after-treatment system, these characteristics being acquired at acquisition times comprised in a preset time period preceding the current acquisition time,
- adding, for each among the plurality of training motor vehicles, the second mathematical quantities to the characteristic vector.

According to a second embodiment, the first mathematical quantities and/or the second mathematical quantities comprise one or more gradients and/or moving averages, computed over all or some of the preset time period.

According to a third embodiment, the machine-learning algorithm is based on the random-forest method or the neural-network method.

The invention also relates to a method for predicting the future resonant frequency of a catalyst for selective reduction of nitrogen oxides, SCR, the resonant frequency being representative of a concentration of a reducing agent within the SCR, the SCR forming part of a system for after-treatment of a flow of exhaust gases of an internal combustion engine with which a motor vehicle is provided, the motor vehicle comprising a data-communication bus coupled to a plurality of sensors of the operating state of the internal combustion engine and of the SCR. The method comprises the following steps:
- acquiring, at each of the acquisition times of a plurality of successive acquisition times, characteristics of the internal combustion engine and characteristics of the SCR from the data-communication bus,
- computing, at the current acquisition time, first mathematical quantities from a plurality of characteristics of the internal combustion engine and a plurality of characteristics of the SCR, these characteristics being acquired at acquisition times comprised in a preset time period preceding the current acquisition time,
- creating a current characteristic vector from the characteristics of the internal combustion engine, from the characteristics of the SCR and from the first mathematical quantities,
- determining a future resonant frequency of the SCR for a future time horizon closer than or equal to the preset time period, using the current characteristic vector and a trained machine-learning model according to the first aspect of the invention.

According to a first embodiment, the data-communication bus is furthermore coupled to a plurality of sensors of the state of fluids flowing through the after-treatment system, the method furthermore comprising the following steps:
- acquiring, at the current acquisition time, characteristics of the fluids flowing through the after-treatment system,
- computing, at the current acquisition time, second mathematical quantities from a plurality of characteristics of the fluids flowing through the after-treatment system, these characteristics being acquired at acquisition times comprised in a preset time period preceding the current acquisition time,
- adding the second mathematical quantities to the current characteristic vector.

According to a second embodiment, the data-communication bus is furthermore coupled to a sensor of the resonant frequency of the SCR, the method furthermore comprising the following steps:
- acquiring, at the current acquisition time, the resonant frequency of the SCR from the data-communication bus,
- associating, at the current acquisition time, the current characteristic vector with the acquired resonant frequency of the SCR, so as to obtain second machine-learning-model variables, and
- training the trained machine-learning model according to the first aspect of the invention, using a machine-learning algorithm and second machine-learning-model variables.

The invention also relates to a method for predicting the future concentration of a reducing agent in a catalyst for selective reduction of nitrogen oxides, SCR, forming part of a system for after-treatment of a flow of exhaust gases of an internal combustion engine with which a motor vehicle is provided. The method comprises the following steps:
- when the internal combustion engine is in operation, predicting a future resonant frequency of the SCR according to the second aspect of the invention,
- determining the future concentration of the reducing agent within the SCR using a previously determined database mapping the resonant frequency of the SCR to the concentration of reducing agent within the SCR.

The invention also relates to an apparatus for predicting the future resonant frequency of a catalyst for selective reduction of nitrogen oxides, SCR, the resonant frequency being representative of a concentration of a reducing agent within the SCR, the SCR forming part of a system for after-treatment of a flow of exhaust gases of an internal combustion engine with which a motor vehicle is provided, the motor vehicle comprising a data-communication bus coupled to a plurality of sensors of the operating state of the internal combustion engine, of the SCR, and of the state of fluids flowing through the after-treatment system. The apparatus comprises:
- a memory for storing characteristics of the internal combustion engine, characteristics of the SCR, characteristics of fluids flowing through the after-treatment system and characteristics of fluids flowing around the internal combustion engine and/or the after-treatment system,
- an electronic control unit (ECU) coupled to the memory, the electronic control unit being configured to execute instructions in order to implement a method according to the second aspect of the invention.

The invention also relates to an apparatus for predicting the future concentration of a reducing agent in a catalyst for selective reduction of nitrogen oxides, SCR, forming part of a system for after-treatment of a flow of exhaust gases of an internal combustion engine with which a motor vehicle is provided, the motor vehicle comprising a data-communication bus coupled to a plurality of sensors of the operating state of the internal combustion engine, of the SCR, and of the state of fluids flowing through the after-treatment system. The apparatus comprises:
- a memory for storing a future resonant frequency of the SCR, said frequency being obtained according to the second aspect of the invention, and a previously determined database mapping the resonant frequency of the SCR to the amount of reducing agent within the SCR, an electronic control unit (ECU) coupled to the memory, the electronic control unit being configured to execute instructions in order to implement a method according to the third aspect of the invention.

According to one embodiment, the control unit is furthermore configured to:
control the addition of a reducing agent depending on the predicted future resonant frequency or on the predicted future concentration of reducing agent, and
stop the addition of the reducing agent when the predicted resonant frequency is beyond a first preset threshold or the predicted concentration of reducing agent is beyond a second preset threshold.

BRIEF DESCRIPTION OF THE DRAWINGS

Other features and advantages of the invention will be better understood on reading the following description with reference to the appended drawings, which are non-limiting and given by way of illustration.

DESCRIPTION OF THE PREFERRED EMBODIMENTS

For the sake of clarity, the elements shown have not necessarily been drawn to the same scale, unless otherwise indicated.

The general principle of the invention is based on the observation of correlations between the resonant frequency of a catalyst for selective reduction (SCR) of nitrogen oxides (NOx) of a motor vehicle and the concentration of ammonia present within the SCR. Thus, by measuring the resonant frequency of an SCR, it is possible to deduce the mass of ammonia present within the SCR. Subsequently, this information may be used to regulate the dose of the reducing agent, in order to decrease or even eliminate the over-abundance of ammonia expelled from the SCR.

Figure 1:
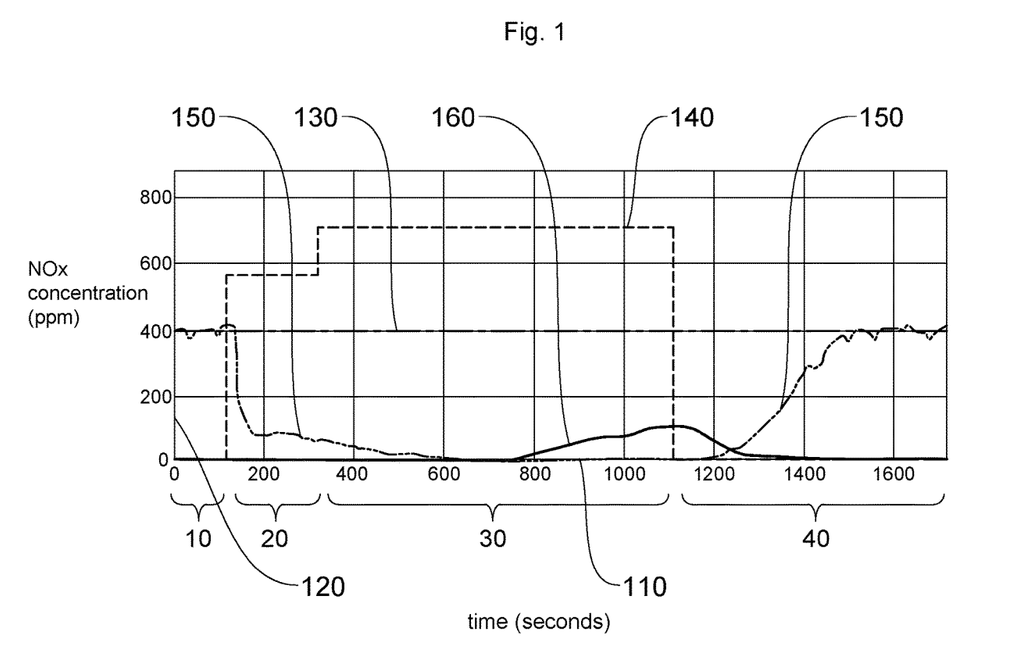
FIG. 1 shows, in graph form, the influence of ammonia on the NOx in an SCR.

To reach this conclusion, many experiments were carried out. One of them is shown in FIG. 1. FIG. 1 shows the variation over time in the NOx and ammonia concentrations contained in the gases flowing through the SCR. The time appears on the x-axis 110 and is expressed in seconds while the NOx concentration is on the y-axis 120 and is expressed in parts per million (ppm). Four curves 130, 140, 150 and 160 illustrating the NOx and ammonia concentrations entering and leaving the SCR have also been shown. Curve 130 corresponds to the NOx concentration entering the SCR. In the experiment of FIG. 1, curve 130 remains constant, which means that the amount of NOx entering the SCR remains constant throughout the experiment. Curve 140 corresponds to the ammonia concentration entering the SCR. As indicated above, the ammonia is obtained, at the inlet of the SCR, following a thermolysis followed by a hydrolysis of a reducing agent, such as urea. Curve 150 corresponds to the NOx concentration leaving the SCR. Curve 160 corresponds to the ammonia concentration leaving the SCR.

In the experiment of FIG. 1, in a first time phase 10, between 0 seconds and about 110 seconds, no ammonia is observed to enter the SCR (the curve 140 is at zero during this phase). This means that the reducing agent has not been injected into the exhaust line leading to the SCR. In this case, it may be seen that curves 130 and 150 are substantially identical. This means that in the absence of ammonia entering the SCR, the NOx concentration entering the SCR is substantially equal to the NOx concentration leaving the SCR. In addition, it will be noted that curve 160 remains substantially at zero.

In a second time phase 20 of FIG. 1, comprised between about 110 seconds and about 320 seconds, a continuous ammonia concentration of about 580 ppm may be seen to enter the SCR. This means that the reducing agent has been injected into the exhaust line leading to the SCR. In this case, it may be seen that curve 150 decreases substantially and regularly with respect to the curve 130. This means that in the absence of ammonia entering the SCR, the NOx concentration leaving the SCR decreases substantially with respect to the NOx concentration entering the SCR. In addition, it will be noted that curve 160 remains substantially at zero. This means that the ammonia present at the inlet of the SCR is entirely consumed during the reduction of the NOx.

Figure 2A:
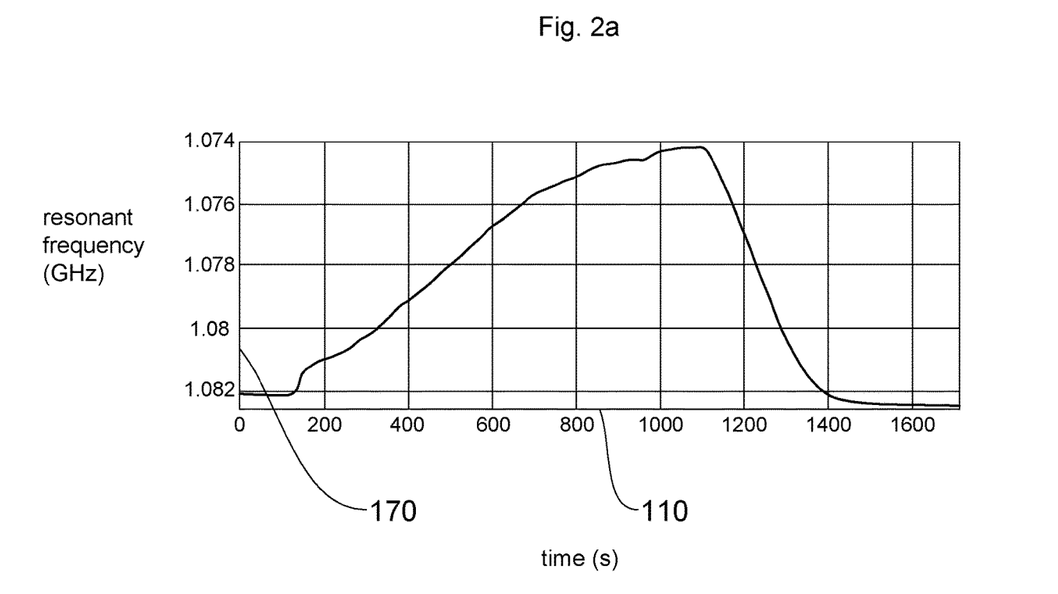
FIGS. 2a and 2b show, in graph form, the variation in the resonant frequency of the SCR used in FIG. 1 and the variation in the mass of ammonia within the SCR used in FIG. 1, respectively.
Figure 2B:
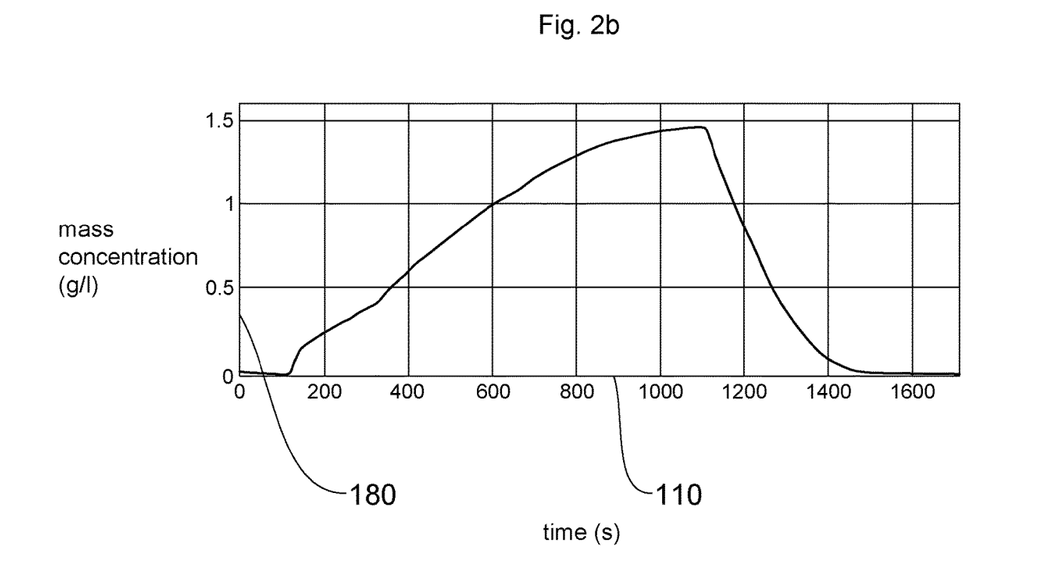

In a third time phase 30 of FIG. 1, comprised between about 320 seconds and about 1120 seconds, a continuous ammonia concentration of about 710 ppm may be seen to enter the SCR. This means that the amount of reducing agent injected into the exhaust line leading to the SCR has increased with respect to the second time phase 20. In this case, it may be seen that the curve 150 continues to decrease substantially and regularly with respect to the curve 130, until it reaches zero at about 600 seconds. This means that the ammonia concentration within the SCR allows the NOx present at the inlet of the SCR to be reduced and made to disappear. In addition, it will be noted that curve 160 remains substantially at zero until about 780 seconds. Specifically, at least a very large part of the ammonia entering the SCR is consumed during the reduction of the NOx. In addition, it is known that any excess ammonia is stored in the SCR in order to prevent ammonia slip. However, it will be noted that between about 780 seconds and 1120 seconds curve 160 begins to increase because the NOx has been completely reduced in the SCR. This means that the maximum capacity of storage of ammonia in the SCR has been exceeded, and hence the concentration of ammonia leaving the SCR increases substantially. In other words, the situation is one in which all the NOx has been reduced while there still remains ammonia that has not been consumed and that is impossible to store in the SCR. This concentration of unconsumed ammonia not stored in the SCR then ends up leaving the SCR and subsequently being released to the atmosphere. FIG. 2b, which will be described below, shows the variation over time in the ammonia mass concentration within the SCR.

Lastly, in a fourth and last time phase 40 of FIG. 1, from about 1120 seconds onward, a complete decrease in the concentration of ammonia entering the SCR is observed. This means that the reducing agent has stopped being injected into the exhaust line leading to the SCR. In this case, it may be seen that curve 150 increases substantially and regularly until it becomes substantially identical to curve 130. In addition, curve 160 decreases substantially until reaching zero. This means that the configuration of the first time phase 10 is gradually returned to.

Figure 3:
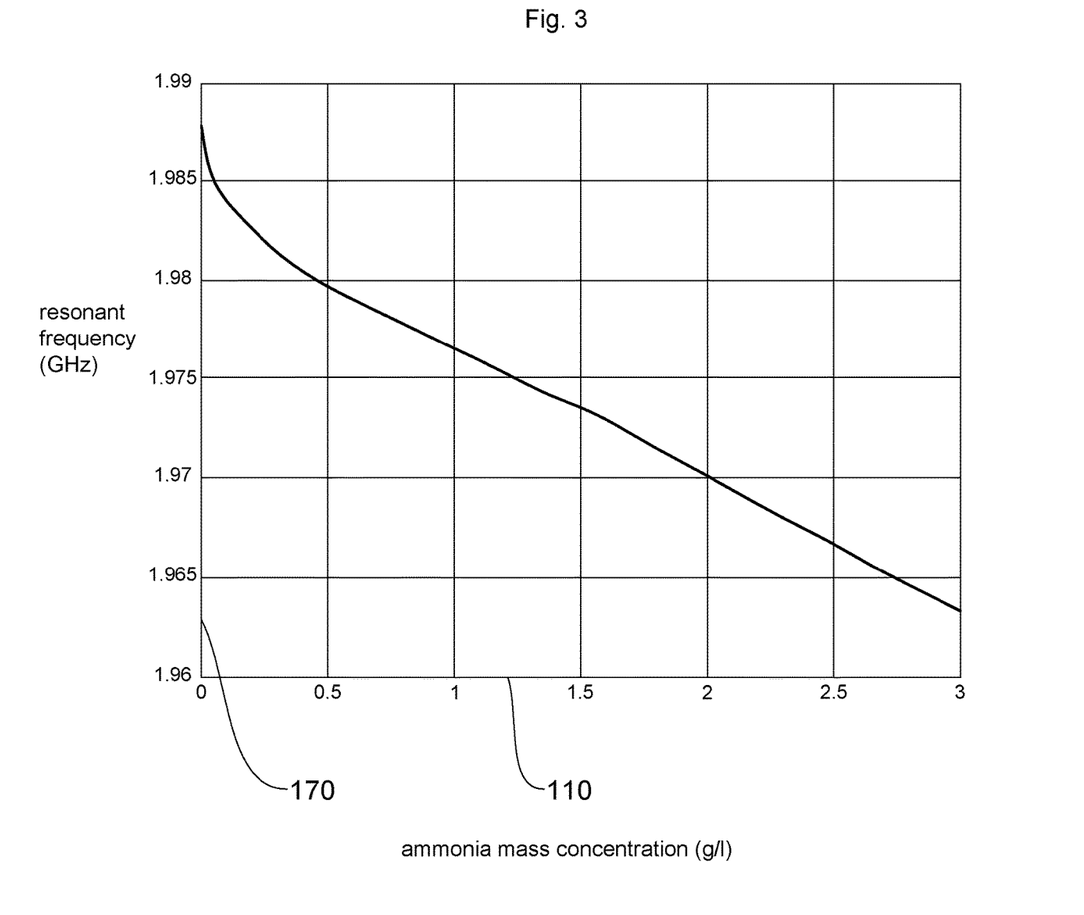
FIG. 3 shows, in graph form, the correlations between the variation in the resonant frequency of FIG. 2a and the variation in the ammonia mass of FIG. 2b.

In parallel with the experiment in FIG. 1, the inventor had the idea of observing the behavior of the resonant frequency of the SCR, since the latter behaves like a resonant cavity. As the SCR comprises a substantially cylindrical resonant cavity, it is possible to choose to excite in the cavity the $TE_{111}$ mode, which is the fundamental mode for such a cavity. In practice, two microwave antennas were suitably positioned within the SCR. Next, one of the microwave antennas was configured to direct an electromagnetic wave at the resonant frequency of the SCR, while the other microwave antenna was configured to receive one or more replicas of the emitted electromagnetic wave. Thus, a variation in the resonant frequency of the SCR was observed during the experiment of FIG. 1. Furthermore, it has been observed that this variation in the resonant frequency of the SCR is strongly correlated with the ammonia concentration within the SCR. These observations are illustrated in FIGS. 2a and 2b. FIG. 2a shows the variation over time in the resonant frequency of the SCR. In FIG. 2a, the time appears on the x-axis 110 as in FIG. 1, while the resonant frequency appears on the y-axis 170 and is expressed in GHz. FIG. 2b shows the variation over time in the ammonia mass concentration within the SCR. In FIG. 2b, the time appears on the x-axis 110 as in FIG. 1, while the mass concentration appears on the y-axis 180 and is expressed in grams per liter (g/l). Thus, in FIGS. 2a and 2b, it is clear that the resonant frequency decreases proportionally to the increase in the ammonia concentration within the SCR. Furthermore, the strong correlation between the resonant frequency of the SCR and the ammonia concentration within the SCR, is illustrated in FIG. 3. In FIG. 3, the ammonia mass concentration appears on the x-axis 180 while the resonant frequency appears on the y-axis 170.

Moreover, as the ammonia concentration within the SCR may be measured, it is then possible to control, depending on the resonant frequency, the injection of reducing agent into the exhaust line, so as to convert all the NOx while minimizing the over-abundance of ammonia at the outlet of the SCR. Thus, it is possible to decrease or even eliminate the over-abundance of ammonia at the outlet of the SCR.

These observations led the inventor to envision using machine learning to create a machine-learning model to predict the resonant frequency of an SCR.

In the invention, the trained machine-learning model is a so-called predictive model in which significant correlations are discovered in a set of past observations and in which it is sought to generalize these correlations to cases that have not yet been observed. As such, the trained machine-learning model according to the invention differs from so-called explanatory models in which it is sought to understand the causal mechanism underlying the effect to be predicted.

In addition, the trained machine-learning model according to the invention is obtained using a so-called supervised learning approach in which past observations are "labeled". In practice, observations are said to be "labeled" when each of them is accompanied by a label which identifies the effect to be predicted.

In this context, the trained machine-learning model then behaves like a filter the transfer parameters of which are adjusted on the basis of presented input/output pairs and in which the input corresponds to data relating to the internal combustion engine and SCR of a motor vehicle and the output corresponds to the resonant frequency of the SCR.

For the sake of preciseness, it will be noted that the notion of transfer parameters of a filter, i.e. the notion used above to illustrate the effects of the motor vehicle's internal-combustion-engine-torque/SCR behavior on the resonant frequency of the SCR, may be equated to that of the feedback obtained in the context of the optimization of a supervised-learning algorithm. In such an optimization, the gradient of the chosen cost function is computed for each input of the system depending on the presented inputs/outputs with the aim of adjusting the transfer parameters.

Figure 4:
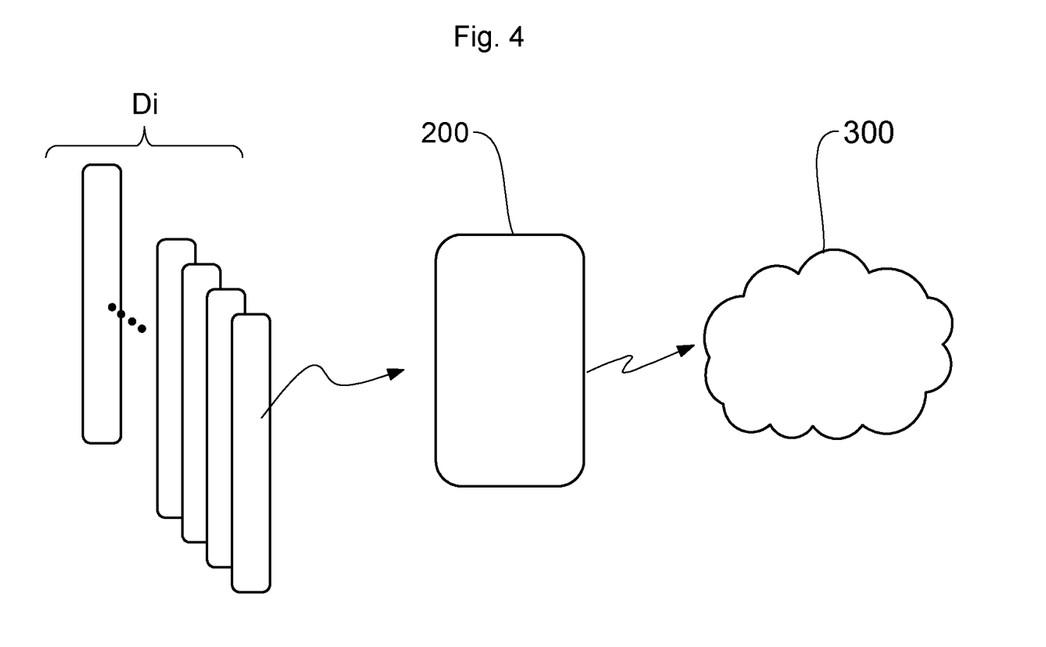
FIG. 4 shows the general principle of the training of a machine-learning model, according to the invention.

FIG. 4 illustrates the general principle of the training of a machine-learning model. In FIG. 4, raw data Di are used by a method 200 to obtain a trained machine-learning model 300.

Figure 5:
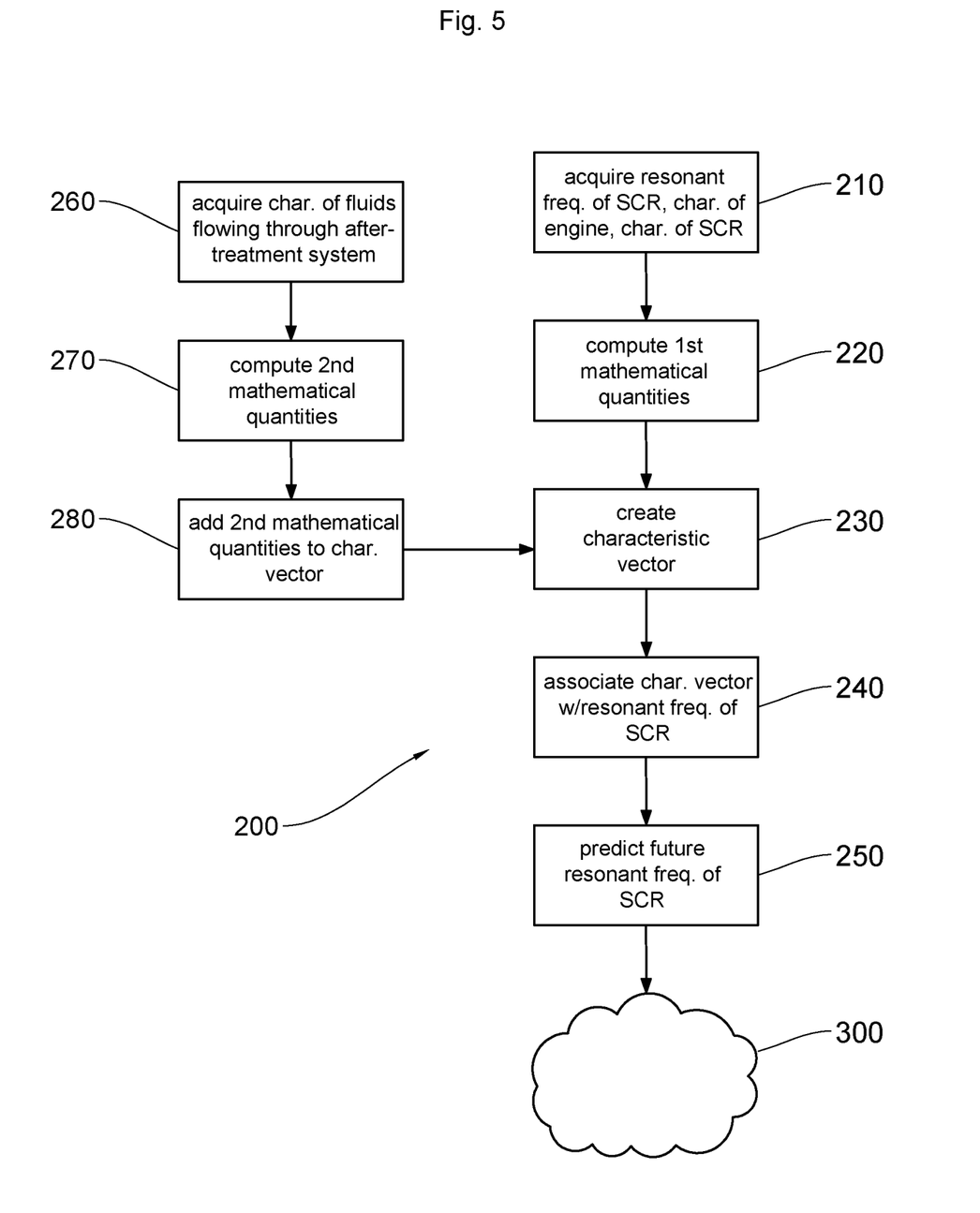
FIG. 5 shows a method for obtaining a trained machine-learning model, according to the invention.

FIG. 5 illustrates the method 200 for obtaining the trained machine-learning model 300, according to the invention.

The method 200 requires a plurality (not shown) of training motor vehicles, each comprising an operating internal combustion engine and an SCR. The SCR forms part of a system for after-treatment of a flow of exhaust gases of each training motor vehicle. In addition, each training motor vehicle comprises a data-communication bus, for example, of CAN (Controller Area Network) or FlexRay type. The communication bus of each training motor vehicle is coupled to a plurality of sensors of the operating state of the internal combustion engine and of the SCR. In one example, the sensors of the operating state of the internal combustion engine of a training motor vehicle may be chosen from the following sensors: sensor of engine rotation speed, sensor of engine-torque setpoint value, engine-torque sensor, engine-speed sensor, engine fuel-flow sensor, engine coolant-temperature sensor or a combination thereof. In another example, the sensors of the operating state of the SCR of a training motor vehicle may be chosen from the following sensors: sensor of the surface temperature of the SCR in one or more positions along the surface of the SCR, SCR volume-flow sensor or a combination thereof.

In the example of FIG. 5, the method 200 firstly acquires, in step 210, at each of the acquisition times of a plurality of successive acquisition times, for each among a plurality of training motor vehicles comprising the internal combustion engine in operation and the SCR, a resonant frequency of the SCR, characteristics of the internal combustion engine and characteristics of the SCR. In an example of step 210, the successive acquisition times are spaced from one another by a duration T, for example 100 ms, 200 ms, 500 ms or 1 s. In another example, the successive acquisition times are spaced from one another by a random duration. Specifically, in this example, the various sensors of the training motor vehicle are considered to transmit messages over the data-communication bus at a frequency that meets their needs. In this case, the method 200 comprises a step consisting in listening to the messages transmitted over the data-communication bus. In the step of this example, it will be necessary to carry out subsequent processing of the data collected from the data-communication bus to correct the temporal distribution of the observed messages and achieve a temporal distribution such that the observed messages are regularly spaced in time, and for example separated by 100 ms, 200 ms, 500 ms or 1 s. For example, interpolations may be performed or suitable averages may be computed to obtain a value representative of the messages observed in the desired time interval.

Next, in step 220, at each acquisition time, for each among the plurality of training motor vehicles, first mathematical quantities are computed from a plurality of characteristics of the internal combustion engine and a plurality of characteristics of the SCR, these characteristics being acquired at acquisition times comprised in a preset time period preceding the current acquisition time.

In an example of step 220, the first mathematical quantities are obtained using a mathematical function chosen from: a square-root function, a power function, a logarithm, an exponential function, a gradient function, a moving-average function or a combination thereof. However, other mathematical functions may be considered.

In another example of step 220, the preset time period is chosen from the following values: 2 s, 5 s, 10 s, 15 s, 30 s or 60 s.

Moreover, in step 230, for each among the plurality of training motor vehicles, a characteristic vector is created from the characteristics of the internal combustion engine, from the characteristics of the SCR and from the first mathematical quantities.

Next, in step 240, at each acquisition time, for each among the plurality of training motor vehicles, the characteristic vector is associated with the resonant frequency of the SCR, so as to obtain first machine-learning-model variables.

Lastly, in step 250, a machine-learning model is trained to predict, for a future time horizon closer than or equal to the preset time period, a future resonant frequency of the SCR forming part of the system for after-treatment of the flow of exhaust gases of the internal combustion engine of a motor vehicle, using a machine-learning algorithm and the first machine-learning-model variables. In one particular implementation, the preset future time horizon is closer than or equal to the preset time period.

In step 250, the machine-learning model is trained by delivering, to the machine-learning model, a training set taking the form of pairs (X, Y), in which X corresponds to a set of input features and Y corresponds to an output feature. In the invention, the training set is determined from the first machine-learning-model variables. In practice, a pair (X, Y) is defined such that the input feature X comprises the vector characteristic of the first machine-learning-model variables and the output feature Y comprises the resonant frequency of the SCR of the training motor vehicle, for the first machine-learning-model variables that are associated with the preset future time horizon.

To illustrate step 250, let us take an example in which the preset future time horizon is considered to be set to 100 ms. In this case, for each pair (X, Y), if the input feature X comprises the vector characteristic of the first machine-learning-model variables associated with acquisition time t, then the output feature Y will comprise the resonant frequency of the SCR of the training motor vehicle for the first machine-learning-model variables that are associated with the acquisition time t+100 ms. Let us consider another example in which the preset future time horizon is considered to be set to 250 ms. In this case, for each pair (X, Y), if the input feature X comprises the vector characteristic of the first machine-learning-model variables associated with acquisition time t, then the output feature Y will comprise the resonant frequency of the SCR of the training motor vehicle for the first machine-learning-model variables that are associated with the acquisition time t+250 ms.

It will be noted that it is envisioned to train a plurality of trained machine-learning models 300, in order to predict the future resonant frequency of the SCR of a motor vehicle comprising the internal combustion engine used by the training motor vehicles, and to do so for a plurality of preset future time horizons. Thus, for example, a first trained machine-learning model 300 will possibly be obtained for a preset future time horizon of 100 ms, a second trained machine-learning model 300 will possibly be obtained for a preset future time horizon of 150 ms, a third trained machine-learning model 300 will possibly be obtained for a preset future time horizon of 250 ms and a fourth trained machine-learning model 300 will possibly be obtained for a preset future time horizon of 500 ms. In this example, each trained machine-learning model 300 then uses a different training set derived from the first machine-learning-model variables.

In an example of step 250, the machine-learning algorithm is based on the random-forest method. For example, good results have been obtained with a variant of the random-forest method known as extremely randomized trees. However, other regression-based supervised machine-learning algorithms may also be envisaged. For example, good results have been obtained with methods based on neural networks such as self-normalizing neural networks.

In one particular implementation, the trained machine-learning model 300 also takes into consideration characteristics of the fluids flowing through the after-treatment system to which the SCR belongs. In this case, the communication bus of each training motor vehicle is coupled to a plurality of sensors of the operating state of the after-treatment system. Such an after-treatment system may comprise, as known, the following elements: a diesel oxidation catalyst (DOC), a mixer, a diesel particulate filter (SDPF), an exhaust-gas-recirculation (EGR) device, or a combination thereof.

In this particular implementation, the method 200 further firstly acquires, in step 260, at each acquisition time, for each among the plurality of training motor vehicles, characteristics of the fluids flowing through the after-treatment system. In an example of step 260, the sensors of the operating state of the post-processing system of a driving motor vehicle may be chosen from the following sensors: sensor of the NOx concentration before and/or after one or more elements of the after-treatment system, sensor of temperature, pressure and/or flow of exhaust gases before and/or after one or more elements of the after-treatment system or a combination thereof. In one particular implementation, the characteristics of the fluids flowing through the after-treatment system are acquired at a frequency lower than the frequency of the plurality of successive acquisition times. For example, the characteristics of the fluids flowing through the after-treatment system may be acquired every 500 ms or 1 s, while the acquisition frequency of the plurality of successive acquisition times may be 100 ms or 250 ms.

Next, in step 270, at each acquisition time, for each among the plurality of training motor vehicles, second mathematical quantities are computed from a plurality of characteristics of the fluids flowing through the after-treatment system, these characteristics being acquired at acquisition times comprised in a preset time period preceding the current acquisition time.

Lastly, in step 280, for each among the plurality of training motor vehicles, the second mathematical quantities are added to the characteristic vector.

In an example of step 280, the second mathematical quantities are obtained using a mathematical function chosen from: a square-root function, a power function, a logarithm, an exponential function, a gradient function, a moving-average function or a combination thereof. However, other mathematical functions may be considered.

In another particular implementation, in the same way as in the previous particular implementation, the trained machine-learning model 300 may take into consideration characteristics of the fluids flowing around the internal combustion engine and/or the after-treatment system. In this case, the communication bus of each training motor vehicle is coupled to a plurality of sensors of the state of these fluids flowing around the internal combustion engine and/or the after-treatment system. For example, it could be a question of a sensor of the ambient air temperature before and/or after one or more elements of the after-treatment system, of a sensor of the ambient air temperature around the internal combustion engine or of a combination thereof.

Figure 6:
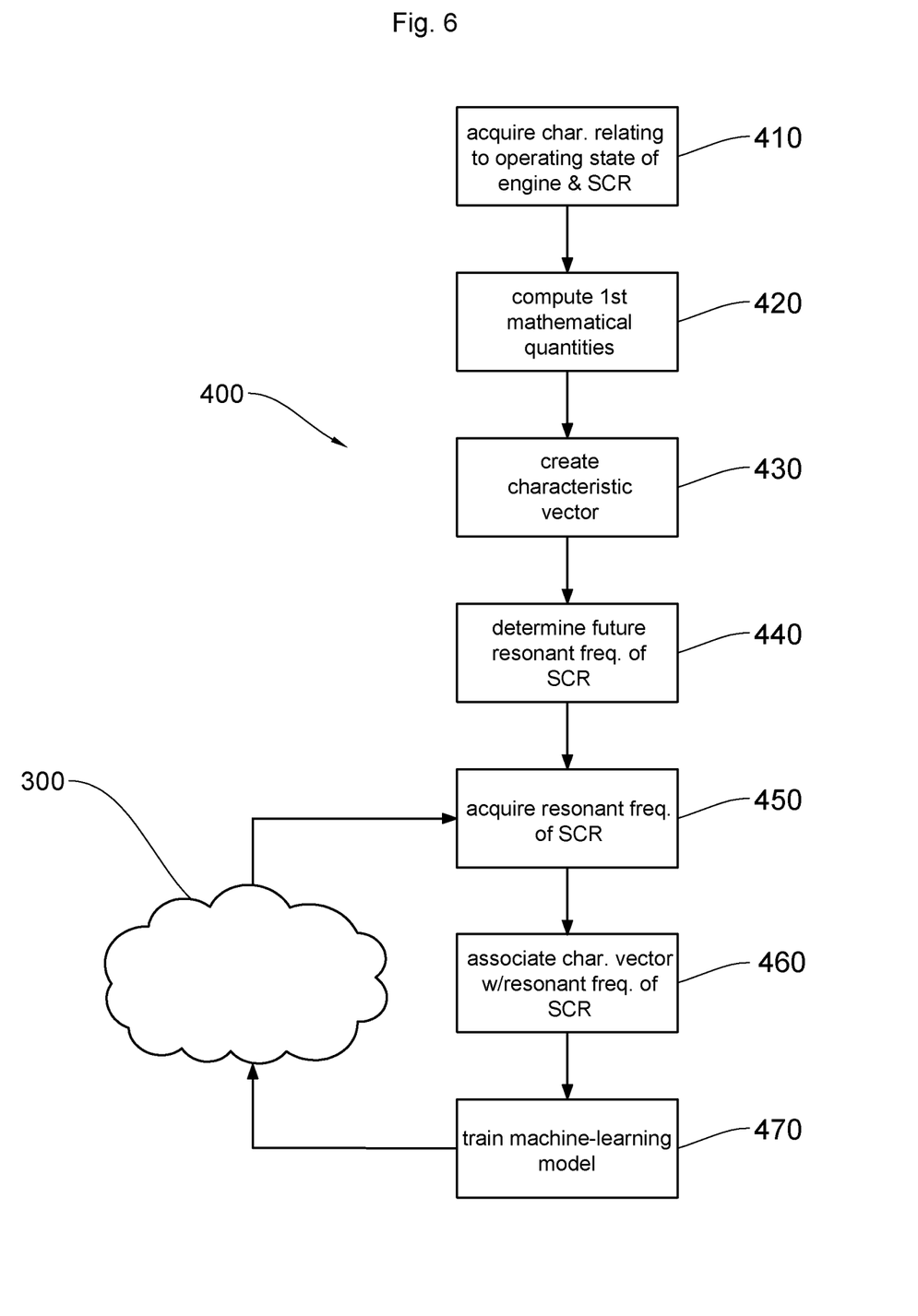
FIG. 6 shows a method for using the trained machine-learning model in FIG. 5.

FIG. 6 illustrates a method 400 for using the trained machine-learning model 300 in a motor vehicle comprising the internal combustion engine and SCR used in the training motor vehicles. Furthermore, just like the training motor vehicles, the motor vehicle comprises a data-communication bus that is coupled to a plurality of sensors of the operating state of the internal combustion engine and of the SCR.

The method 400 firstly acquires, from the data-communication bus, in step 410, at each of the acquisition times of a plurality of successive acquisition times, characteristics relating to the operating state of the internal combustion engine.

Moreover, in step 410, at a current acquisition time, characteristics relating to the operating state of the SCR are also acquired from the data-communication bus.

Next, in step 420, at the current acquisition time, first mathematical quantities are computed from a plurality of characteristics of the internal combustion engine and a plurality of characteristics of the SCR, these characteristics being acquired at acquisition times comprised in a preset time period preceding the current acquisition time.

Subsequently, in step 430, a current characteristic vector is created from the characteristics of the internal combustion engine, from the characteristics of the SCR and from the first mathematical quantities, Lastly, in step 440, a future resonant frequency of the SCR is determined for a preset future time horizon, using the current characteristic vector and the trained machine-learning model 300. In one particular implementation, the preset future time horizon is closer than or equal to the preset time period.

In one particular implementation, the method 400 takes into consideration characteristics of the fluids flowing through the after-treatment system, in the same way as during training of the trained machine-learning model 300.

Furthermore, in another particular implementation, the method 400 takes into consideration characteristics of the fluids flowing around the internal combustion engine and/or the after-treatment system, in the same way as during training of the trained machine-learning model 300.

In another particular implementation, the data-communication bus is furthermore coupled to a sensor of the resonant frequency of the SCR. In this case, the method 400 uses the resonant-frequency values acquired by the sensor of the resonant frequency of the SCR to train the trained machine-learning model 300, when the internal combustion engine is in operation.

In this particular implementation, which corresponds to continuous training of the trained machine-learning model 300, the method 400 furthermore firstly acquires, in step 450, at the current acquisition time, the resonant frequency of the SCR from the data-communication bus. Next, in step 460, at the current acquisition time, the current characteristic vector is associated with the acquired resonant frequency of the SCR, so as to obtain second machine-learning-model variables.

Lastly, in step 470, the trained machine-learning model 300 is trained using a machine-learning algorithm and second machine-learning-model variables.

In one particular embodiment of the invention, the various steps of the method 400 are defined by computer-program instructions. Therefore, the invention is also pertains to a program containing a computer-program code stored on a non-transient storage medium, this program code being capable of executing the steps of the method 400 when the computer program is loaded into the computer or run on the computer.

Using the method 400, it is also envisaged to predict the future ammonia concentration within the SCR. To this end, the future ammonia concentration within the SCR may be determined using a previously determined database mapping the resonant frequency of the SCR to the ammonia concentration within the SCR.

Figure 7:
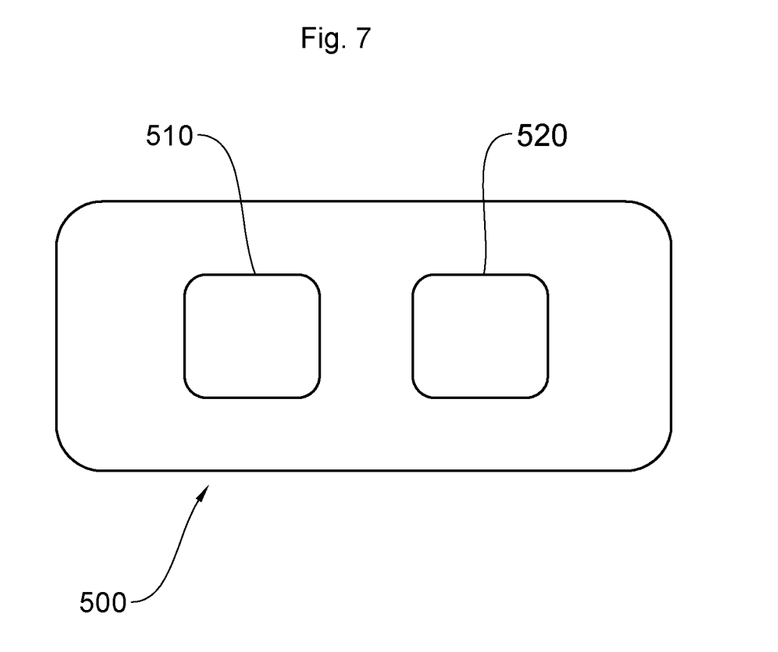
FIG. 7 shows a predicting apparatus according to one implementation of the invention.

FIG. 7 illustrates an apparatus 500 for predicting the future resonant frequency of the SCR of a motor vehicle comprising the internal combustion engine and SCR used in the training motor vehicles.

The apparatus 500 comprises a memory 510 and a microcomputer such as an electronic control unit (ECU) 520.

In FIG. 7, memory 510 is provided to store characteristics of the internal combustion engine, characteristics of the SCR, characteristics of the fluids flowing through the after-treatment system, and characteristics of the fluids flowing around the internal combustion engine and/or after-treatment system. Moreover, the electronic control unit 520 is coupled to the memory 510, while being configured to execute instructions to implement the method 400.

In one particular implementation (not illustrated) of the apparatus 500, the memory 510 and the electronic control unit 520 are arranged in a remote server of a cloud architecture. By cloud, what is meant is an assembly of interconnected hardware, networks and computer software accessible from anywhere in the world. In this case, the apparatus 500 comprises a transceiver, for example a radiofrequency transceiver, configured to transmit, to the remote server, characteristics relating to the internal combustion engine, to the SCR, to the fluids flowing through the after-treatment system and to the fluids flowing around the internal combustion engine and/or after-treatment system. Subsequently, the transceiver is configured to receive the resonant frequency of the SCR predicted by the electronic control unit 520.

In an example of FIG. 7, the apparatus 500 may be used in a system for controlling the addition of a reducing agent in an exhaust system of a motor vehicle comprising the internal combustion engine and the SCR used in the training motor vehicles. Thus, for example, the apparatus 500 may control the addition of the reducing agent depending on the predicted future resonant frequency or the predicted future concentration of reducing agent. In particular, the apparatus 500 may stop the addition of the reducing agent when the predicted resonant frequency is beyond a first preset threshold or the predicted concentration of reducing agent is beyond a second preset threshold.

The trained machine-learning model 300 according to the invention has the advantage of being able to be used with data not present in the training set. Furthermore, it may continuously improve by virtue of continuous acquisition of new training data.

The present invention has been described and illustrated via the present detailed description and via the figures. However, the present invention is not limited to the presented embodiments. Thus, after reading the present description and studying the appended drawings, those skilled in the art will be able to deduce and implement other embodiments and variants.

The invention claimed is:

1. A trained machine-learning model (300) for predicting a future resonant frequency of a catalyst for selective reduction of nitrogen oxides (SCR), the future resonant frequency being representative of a concentration of a reducing agent within the SCR, the SCR forming part of a system for after-treatment of a flow of exhaust gases of an internal combustion engine with which a motor vehicle is provided, the after-treatment system including the reducing agent, which is configured to be added to the flow of exhaust gases upstream of the SCR, the trained machine-learning model being obtained by a method comprising:

acquiring, at each of the acquisition times of a plurality of successive acquisition times, for each training motor vehicle of a plurality of training motor vehicles comprising the internal combustion engine in operation and the SCR, a resonant frequency of the SCR, a plurality of characteristics of the internal combustion engine, and a plurality of characteristics of the SCR, the characteristics of the internal combustion engine being related to one or more of: engine speed, engine torque, engine fuel-flow, engine coolant temperature, the characteristics of the SCR being related to one or more of: surface temperature of the SCR and SCR volume-flow;

computing, at each of the acquisition times, for each of the plurality of training motor vehicles, first mathematical quantities values obtained using a mathematical function from the plurality of characteristics of the internal combustion engine and the plurality of characteristics of the SCR, the characteristics of the internal combustion engine and the characteristics of the SCR being acquired at acquisition times comprised within a preset time period preceding the current acquisition time;

creating, for each among of the plurality of training motor vehicles, a characteristic vector from the characteristics of the internal combustion engine, from the characteristics of the SCR, and from the first mathematical quantities;

associating, at each of the acquisition times, for each of the plurality of training motor vehicles, the characteristic vector with the resonant frequency of the SCR, to obtain first machine-learning-model variables; and training a machine-learning model to predict, for a future time point closer than or equal to the preset time period, a future resonant frequency of the SCR forming part of the system for after-treatment of the flow of exhaust gases of the internal combustion engine of a motor vehicle, using a machine-learning algorithm and the first machine-learning-model variables.

2. The trained machine-learning model as claimed in claim 1, further comprising:

acquiring, at each of the acquisition times, for each of the plurality of training motor vehicles, a plurality of characteristics of the gases flowing through the after-treatment system, the characteristics of the gases flowing through the after-treatment system being related to one or more of: gas concentration, gas temperature, and gas flow;

computing, at each of the acquisition times, for each of the plurality of training motor vehicles, second mathematical quantities obtained using a mathematical function from the plurality of characteristics of the gases flowing through the after-treatment system, the characteristics of the gases being acquired at the acquisition times comprised in the preset time period preceding the current acquisition time; and adding, for each of the plurality of training motor vehicles, the second mathematical quantities to the characteristic vector.

3. The trained machine-learning model as claimed in claim 1, wherein one or more of the first mathematical quantities and the second mathematical quantities comprise one or more gradients and/or averages, computed over all or some of the preset time period.

4. The trained machine-learning model as claimed in claim 1, wherein the machine-learning algorithm is based on a random-forest method or a neural-network method.

5. A method for predicting a future resonant frequency of a catalyst for selective reduction of nitrogen oxides (SCR), the future resonant frequency being representative of a concentration of a reducing agent within the SCR, the SCR forming part of a system for after-treatment of a flow of exhaust gases of an internal combustion engine with which a motor vehicle is provided, the motor vehicle including a data-communication bus coupled to a plurality of sensors configured to sense an operating state of the internal combustion engine and an operating state of the SCR, the method comprising:

acquiring, at each of the acquisition times of a plurality of successive acquisition times, a plurality of characteristics of the internal combustion engine, and a plurality of characteristics of the SCR from the data-communication bus, the characteristics of the internal combustion engine being related to one or more of: engine speed, engine torque, engine fuel-flow, engine coolant temperature, the characteristics of the SCR being related to one or more of: surface temperature of the SCR and SCR volume-flow;

computing, at a current acquisition time of the plurality of acquisition times, first mathematical quantities obtained using a mathematical function from the plurality of characteristics of the internal combustion engine and the plurality of characteristics of the SCR, the characteristics of the internal combustion engine and the characteristics of the SCR being acquired at the acquisition times comprised in a preset time period preceding the current acquisition time;

creating a current characteristic vector from the characteristics of the internal combustion engine, from the characteristics of the SCR, and from the first mathematical quantities; and determining a future resonant frequency of the SCR for a future time point closer than or equal to the preset time period, using the current characteristic vector and the trained machine-learning model as claimed in claim 1.

6. The predicting method as claimed in claim 5, wherein the data-communication bus is coupled to a plurality of sensors configured to sense a state of gases flowing through the after-treatment system, the method further comprising:

acquiring, at the current acquisition time, characteristics of the gases flowing through the after-treatment system;

computing, at the current acquisition time, second mathematical quantities obtained using a mathematical function from a plurality of characteristics of the fluids gases flowing through the after-treatment system, the characteristics of the gases flowing through the after-treatment system being acquired at the acquisition times comprised in the preset time period preceding the current acquisition time; and adding the second mathematical quantities to the current characteristic vector.

7. A method for predicting a future resonant frequency of a catalyst for selective reduction of nitrogen oxides (SCR), the future resonant frequency being representative of a concentration of a reducing agent within the SCR, the SCR forming part of a system for after-treatment of a flow of exhaust gases of an internal combustion engine with which a motor vehicle is provided, the motor vehicle comprising a data-communication bus coupled to a plurality of sensors of the configured to sense an operating state of the internal combustion engine and an operating state of the SCR, the method comprising the following steps:

acquiring, at each of the acquisition times of a plurality of successive acquisition times, a plurality of characteristics of the internal combustion engine and a plurality of characteristics of the SCR from the data-communication bus, the data-communication bus being coupled to one of the sensors configured to sense a resonant frequency of the SCR, the characteristics of the internal combustion engine being related to one or more of: engine speed, engine torque, engine fuel-flow, engine coolant temperature, the characteristics of the SCR being related to one or more of: surface temperature of the SCR and SCR volume-flow;

computing, at a current acquisition time of the acquisition times, first mathematical quantities obtained using a mathematical function from the plurality of characteristics of the internal combustion engine and the plurality of characteristics of the SCR, the characteristics of the internal combustion engine and the characteristics of the SCR being acquired at acquisition times comprised within a preset time period preceding the current acquisition time;

creating a current characteristic vector from the characteristics of the internal combustion engine, from the characteristics of the SCR, and from the first mathematical values; quantities, determining a future resonant frequency of the SCR for a future time horizon point closer than or equal to the preset time period, using the current characteristic vector and the trained machine-learning model as claimed in claim 1; wherein the data-communication bus is furthermore coupled to a sensor of the resonant frequency of the SCR, the method furthermore comprising the following steps:

acquiring, at the current acquisition time, the resonant frequency of the SCR from the data-communication bus;

associating, at the current acquisition time, the current characteristic vector with the acquired resonant frequency of the SCR, so as to obtain second machine-learning-model variables; and training the trained machine-learning model as claimed in claim 1, using another machine-learning algorithm and second machine-learning-model variables.

8. A method for predicting a future concentration of a reducing agent in a catalyst for selective reduction of nitrogen oxides (SCR), the SCR forming part of a system for after-treatment of flow of exhaust gases of an internal combustion engine with which a motor vehicle is provided, the method comprising:

when the internal combustion engine is in operation, predicting the future resonant frequency of the SCR according to claim 5; and determining the future concentration of the reducing agent within the SCR using a previously-determined database mapping the resonant frequency of the SCR to the concentration of reducing agent within the SCR.

9. An apparatus for predicting a future resonant frequency of a catalyst for selective reduction of nitrogen oxides (SCR), the future resonant frequency being representative of a concentration of a reducing agent within the SCR, the SCR forming part of a system for after-treatment of a flow of exhaust gases of an internal combustion engine with which a motor vehicle is provided, the motor vehicle including a data-communication bus coupled to a plurality of sensors configured to sense an operating state of the internal combustion engine, an operating state of the SCR, and a state of gases flowing through the after-treatment system, the apparatus comprising:

a memory configured to store a plurality of characteristics of the internal combustion engine, a plurality of characteristics of the SCR, a plurality of characteristics of the gases flowing through the after-treatment system, and the characteristics of gases flowing around one or more of the internal combustion engine and the after-treatment system, the characteristics of the internal combustion engine being related to one or more of: engine speed, engine torque, engine fuel-flow, engine coolant temperature, the characteristics of the SCR being related to one or more of: surface temperature of the SCR and SCR volume-flow, the characteristics of the gases flowing through the after-treatment system being related to one or more of: gas concentration, gas temperature, and gas flow, the characteristics of the gases flowing around one or more of the internal combustion engine and the after-treatment system being related to a property of the gases flowing around one or more of the internal combustion engine and the after-treatment system; and an electronic controller coupled to the memory, the electronic controller being configured to execute instructions in order to implement the method as claimed in claim 5.

10. An apparatus for predicting a future concentration of a reducing agent in a catalyst for selective reduction of nitrogen oxides (SCR), the SCR forming part of a system for after-treatment of a flow of exhaust gases of an internal combustion engine with which a motor vehicle is provided, the motor vehicle including a data-communication bus coupled to a plurality of sensors configured to sense an operating state of the internal combustion engine, an operating state of the SCR, and a state of gases flowing through the after-treatment system, the apparatus comprising:

a memory configured to store a future resonant frequency of the SCR, said future resonant frequency being obtained according to claim 5, and a previously determined database mapping the future resonant frequency of the SCR to an amount of the reducing agent within the SCR; and an electronic controller coupled to the memory, the electronic controller being configured to execute instructions in order to implement a method for predicting the future concentration of the reducing agent in the catalyst for selective reduction of nitrogen oxides (SCR), the SCR forming part of a system for after-treatment of a flow of exhaust gases of an internal combustion engine with which a motor vehicle is provided, the method including:

when the internal combustion engine is in operation, predicting the future resonant frequency of the SCR according to claim 5, and determining the future concentration of the reducing agent within the SCR using a previously-determined database mapping the resonant frequency of the SCR to the concentration of reducing agent within the SCR.

11. The apparatus as claimed in claim 9, wherein the controller is configured to:

control an addition of the reducing agent in the SCR depending on the predicted future resonant frequency or on the predicted future concentration of reducing agent, and stop the addition of the reducing agent when the predicted resonant frequency is beyond a first preset threshold or the predicted concentration of reducing agent is beyond a second preset threshold.

12. The trained machine-learning model as claimed in claim 2, wherein one or more of the first mathematical quantities and/or values and the second mathematical quantities comprise one or more gradients and/or moving averages, computed over all or some of the preset time period.

13. The trained machine-learning model as claimed in claim 2, wherein the machine-learning algorithm is based on a random-forest method or a neural-network method.

14. The trained machine-learning model as claimed in claim 3, wherein the machine-learning algorithm is based on a random-forest method or a neural-network method.

15. A method for predicting a future resonant frequency of a catalyst for selective reduction of nitrogen oxides, SCR, (SCR), the future resonant frequency being representative of a concentration of a reducing agent within the SCR, the SCR forming part of a system for after-treatment of a flow of exhaust gases of an internal combustion engine with which a motor vehicle is provided, the motor vehicle comprising including a data-communication bus coupled to a plurality of sensors of the configured to sense an operating state of the internal combustion engine and an operating state of the SCR, the method comprising the following steps:

acquiring, at each of the acquisition times of a plurality of successive acquisition times, a plurality of characteristics of the internal combustion engine, and a plurality of characteristics of the SCR from the data-communication bus, the characteristics of the internal combustion engine being related to one or more of: engine speed, engine torque, engine fuel-flow, engine coolant temperature, the characteristics of the SCR being related to one or more of: surface temperature of the SCR and SCR volume-flow;

computing, at a current acquisition time of the plurality of acquisition times, first mathematical quantities values obtained using a mathematical function from the plurality of characteristics of the internal combustion engine and the plurality of characteristics of the SCR, these the characteristics of the internal combustion engine and the characteristics of the SCR being acquired at the acquisition times comprised in a preset time period preceding the current acquisition time;

creating a current characteristic vector from the characteristics of the internal combustion engine, the characteristics of the SCR, and from the first mathematical quantities; and determining a future resonant frequency of the SCR for a future time point closer than or equal to the preset time period, using the current characteristic vector and the trained machine-learning model as claimed in claim 2.

16. A method for predicting a future resonant frequency of a catalyst for selective reduction of nitrogen oxides, SCR, (SCR), the future resonant frequency being representative of a concentration of a reducing agent within the SCR, the SCR forming part of a system for after-treatment of a flow of exhaust gases of an internal combustion engine with which a motor vehicle is provided, the motor vehicle comprising including a data-communication bus coupled to a plurality of sensors of the configured to sense an operating state of the internal combustion engine and an operating state of the SCR, the method comprising:

acquiring, at each of the acquisition times of a plurality of successive acquisition times, a plurality of characteristics of the internal combustion engine, and a plurality of characteristics of the SCR from the data-communication bus, the characteristics of the internal combustion engine being related to one or more of: engine speed, engine torque, engine fuel-flow, engine coolant temperature, the characteristics of the SCR being related to one or more of: surface temperature of the SCR and SCR volume-flow;

computing, at a current acquisition time of the plurality of acquisition times, first mathematical quantities obtained using a mathematical function from the plurality of characteristics of the internal combustion engine and the plurality of characteristics of the SCR, the characteristics of the internal combustion engine and the characteristics of the SCR being acquired at the acquisition times comprised in a preset time period preceding the current acquisition time;

creating a current characteristic vector from the characteristics of the internal combustion engine, from the characteristics of the SCR, and from the first mathematical values quantities; and determining a future resonant frequency of the SCR for a future time point closer than or equal to the preset time period, using the current characteristic vector and the trained machine-learning model as claimed in claim 3.

17. A method for predicting a future resonant frequency of a catalyst for selective reduction of nitrogen oxides (SCR), the future resonant frequency being representative of a concentration of a reducing agent within the SCR, the SCR forming part of a system for after-treatment of a flow of exhaust gases of an internal combustion engine with which a motor vehicle is provided, the motor vehicle including a data-communication bus coupled to a plurality of sensors of the configured to sense an operating state of the internal combustion engine and an operating state of the SCR, the method comprising:

acquiring, at each of the acquisition times of a plurality of successive acquisition times, a plurality of characteristics of the internal combustion engine, and a plurality of characteristics of the SCR from the data-communication bus, the characteristics of the internal combustion engine being related to one or more of: engine speed, engine torque, engine fuel-flow, engine coolant temperature, the characteristics of the SCR being related to one or more of: surface temperature of the SCR and SCR volume flow;

computing, at a current acquisition time of the plurality of acquisition times, first mathematical quantities obtained using a mathematical function from the plurality of characteristics of the internal combustion engine and the plurality of characteristics of the SCR, the characteristics of the internal combustion engine and the characteristics of the SCR being acquired at the acquisition times comprised in a preset time period preceding the current acquisition time;

creating a current characteristic vector from the characteristics of the internal combustion engine, from the characteristics of the SCR, and from the first mathematical quantities; and determining a future resonant frequency of the SCR for a future time point closer than or equal to the preset time period, using the current characteristic vector and the trained machine-learning model as claimed in claim 4.

18. A method for predicting a future concentration of a reducing agent in a catalyst for selective reduction of nitrogen oxides (SCR), the SCR forming part of a system for after-treatment of flow of exhaust gases of an internal combustion engine with which a motor vehicle is provided, the method comprising:

when the internal combustion engine is in operation, predicting the future resonant frequency of the SCR according to claim 6; and determining the future concentration of the reducing agent within the SCR using a previously-determined database mapping the resonant frequency of the SCR to the concentration of reducing agent within the SCR.

19. A method for predicting a future concentration of a reducing agent in a catalyst for selective reduction of nitrogen oxides (SCR), the SCR forming part of a system for after-treatment of flow of exhaust gases of an internal combustion engine with which a motor vehicle is provided, the method comprising:

when the internal combustion engine is in operation, predicting the future resonant frequency of the SCR according to claim 7; and determining the future concentration of the reducing agent within the SCR using a previously-determined database mapping the resonant frequency of the SCR to the concentration of reducing agent within the SCR.

20. An apparatus for predicting a future resonant frequency of a catalyst for selective reduction of nitrogen oxides (SCR), the future resonant frequency being representative of a concentration of a reducing agent within the SCR, the SCR forming part of a system for after-treatment of a flow of exhaust gases of an internal combustion engine with which a motor vehicle is provided, the motor vehicle including a data-communication bus coupled to a plurality of sensors configured to sense an operating state of the internal combustion engine, an operating state of the SCR, and a state of gases flowing through the after-treatment system, the apparatus comprising:

a memory configured to store a plurality of characteristics of the internal combustion engine, a plurality of characteristics of the SCR, a plurality of characteristics of the gases flowing through the after-treatment system, and the characteristics of gases flowing around one or more of the internal combustion engine and the after-treatment system, the characteristics of the internal combustion engine being related to one or more of: engine speed, engine torque, engine fuel-flow, engine coolant temperature, the characteristics of the SCR being related to one or more of: surface temperature of the SCR and SCR volume-flow, the characteristics of the gases flowing through the after-treatment system being related to one or more of: gas concentration, gas temperature, and gas flow, the characteristics of the gases flowing around one or more of the internal combustion engine and the after-treatment system being related to a property of the gases flowing around one or more of the internal combustion engine and the after-treatment system; and an electronic controller coupled to the memory, the electronic controller being configured to execute instructions in order to implement the method as claimed in claim 6.

* * * * *